United States Patent [19]

Troiano

[11] Patent Number: 4,599,641
[45] Date of Patent: Jul. 8, 1986

[54] BRIGHTNESS CONTROL APPARATUS FOR A VIDEO SIGNAL PROCESSING SYSTEM

[75] Inventor: Anthony Troiano, Princeton Junction, N.J.

[73] Assignee: RCA Corporation, Princeton, N.J.

[21] Appl. No.: 675,747

[22] Filed: Nov. 28, 1984

[51] Int. Cl.⁴ .................... H04N 9/20; H04N 5/57
[52] U.S. Cl. .................................. 358/39; 358/65; 358/168
[58] Field of Search ............... 358/168, 21 R, 34, 39, 358/64, 65, 66, 74, 172, 243

[56] References Cited

U.S. PATENT DOCUMENTS

| | | | |
|---|---|---|---|
| 4,044,375 | 8/1977 | Norman | 358/168 |
| 4,082,996 | 4/1978 | Hinn | 358/65 |
| 4,143,398 | 3/1979 | Harwood et al. | 358/168 |
| 4,285,008 | 8/1981 | Osawa et al. | 358/65 |
| 4,549,214 | 10/1985 | Hinn | 358/172 |

FOREIGN PATENT DOCUMENTS 0127439 12/1984 European Pat. Off. ............ 358/168

OTHER PUBLICATIONS

Partial Schematic Circuit Diagram of Color—II Video Monitor of Amdek Corp. (Oct. 1981).

*Primary Examiner*—James J. Groody
*Assistant Examiner*—Randall S. Svihla
*Attorney, Agent, or Firm*—P. J. Rasmussen; P. M. Emanuel; R. H. Kurdyla

[57] ABSTRACT

Brightness control apparatus for a color video monitor employing AC coupled video output driver stages is disclosed. A keyed amplifier provides a brightness determinative output pulse with an amplitude related to the setting of a brightness control coupled to the amplifier. The brightness pulse is coupled via separately adjustable brightness tracking circuits to control inputs of video signal clamps respectively associated with each of the color video signal paths between the driver stages and an image display device.

4 Claims, 1 Drawing Figure

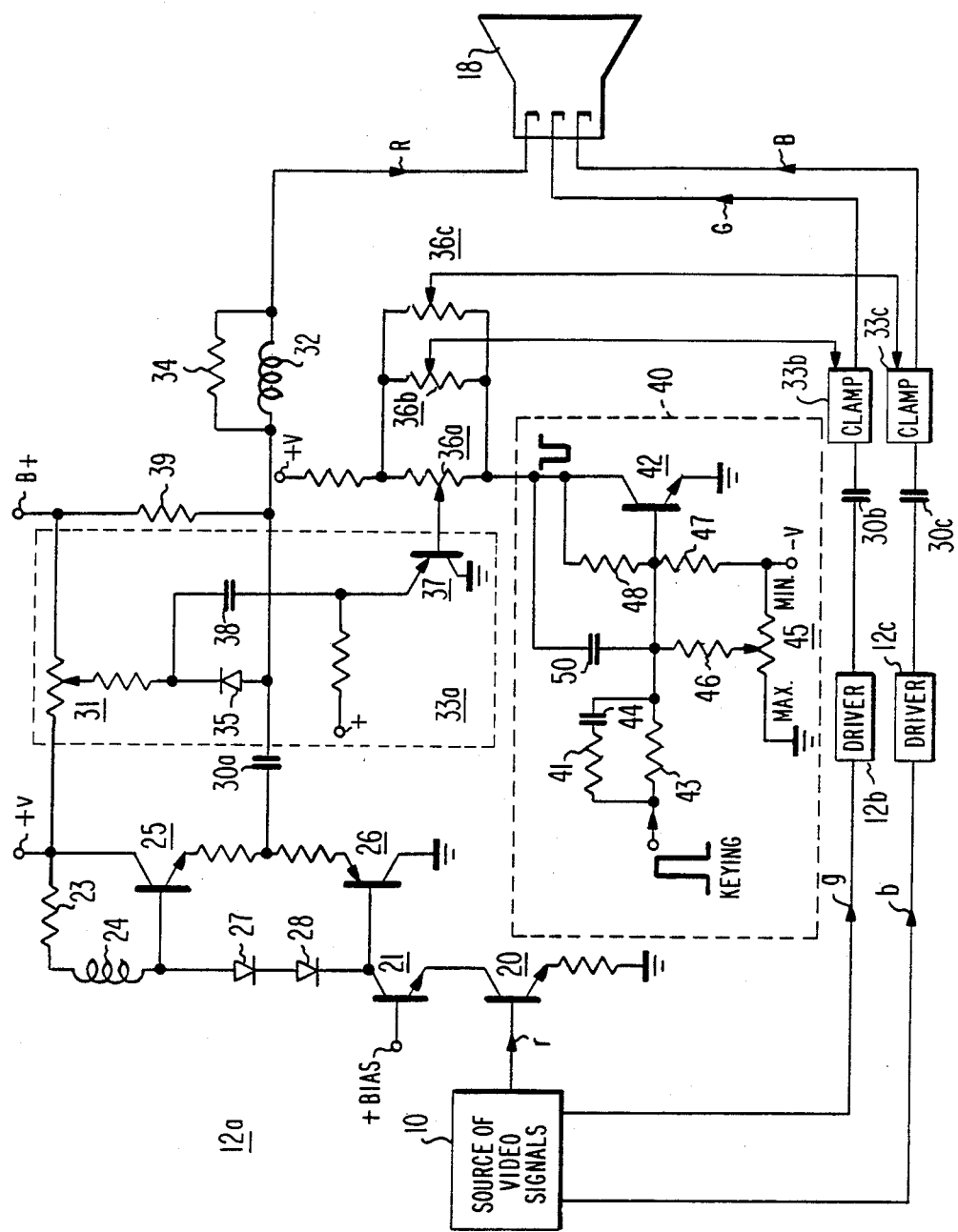

BRIGHTNESS CONTROL APPARATUS FOR A VIDEO SIGNAL PROCESSING SYSTEM

This invention concerns brightness control apparatus in a video signal processing and display system wherein video output signals are AC coupled to an image display device such as a kinescope.

Recent trends towards high definition video signal processing and display systems with significantly increased picture resolution capability, such as video monitors used for data display purposes, dictate the need for a video signal processing system with very wide signal bandwidths, e.g., 100 MHz in some cases. In particular, such wide bandwidth capability should be exhibited by the video output driver amplifiers which provide high level video signals to intensity control electrodes of an associated image display device such as a kinescope. Many wideband kinescope driver amplifier stages exhibit smaller output impedances and greater current levels compared to the driver stages in narrower bandwidth systems such as conventional television receivers. In the case of such wideband video output driver stages it is often desirable to maintain a substantially fixed DC operating condition for the driver stages and, accordingly, it is often desirable to prevent the DC operating condition of the driver stage from varying with changes in the setting of an adjustable image brightness control. A fixed DC operating condition avoids several problems, as follows.

Changes in the DC operating condition of the driver stage due to adjustment of the brightness control require that the operating voltage for the driver stage be large enough to accommodate output DC level shifts associated with such adjustment. Such large supply voltages are undesirable in a wideband kinescope driver because of the resulting increased power consumption and dissipation which would result for a wideband driver already operating at increased DC current levels. In addition, the construction of wideband driver transistor often requires low voltage ratings which do not permit the use of a large supply voltage to accomodate DC output voltage changes. Bias voltage variations associated with DC voltage changes can influence the capacitance parameters of the driver amplifier transistors, undesirably causing operating bandwidth variations with shifts in transistor DC bias. The operating bandwidth capability of the driver transistors also varies with the current gain of the transistor, which is a function of transistor bias current.

In accordance with the principles of the present invention there is disclosed herein an uncomplicated and economical brightness control arrangement for use with AC coupled video output driver stages to avoid the problems associated with DC voltage changes as noted above.

In a preferrred embodiment of the invention, plural color image representative video signals are conveyed from associated video output driver stages to respective intensity control electrodes of an image display device via plural AC signal coupling capacitors. An adjustable brightness control device is coupled to an input of an amplifier which is periodically keyed to operate during periodic image blanking intervals. A periodic output pulse from the amplifier exhibits a brightness determinative amplitude related to the setting of the brightness control. The brightness determinative pulse is coupled via plural separately adjustable brightness tracking controls to control inputs of video signal clamping devices respectively associated with the AC coupling capacitors. Brightness determinative pulses as applied to the control inputs of the clamping devices vary together in amplitude in accordance with the setting of the brightness control, and vary individually in amplitude in accordance with the settings of the tracking controls to compensate for the conduction characteristics of the image display device.

The sole FIGURE of the drawing shows a portion of a color video signal processing and display system such as a video monitor, including a brightness control arrangement in accordance with the principles of the present invention.

Low level color video signals r, g and b from a source 10 are provided to respective video output driver stages 12a, 12b and 12c, which supply high level amplified color video signals R, G and B to respective cathode intensity control electrodes of a color image reproducing kinescope 18. Since driver stages 12a, 12b and 12c are identical in structure and operation, only the circuit details of red signal driver stage 12a are shown and will be discussed.

Red color signal r is applied to the base input of an input common emitter amplifier transistor 20 which is arranged in a cascode amplifier configuration with an output common base transistor 21. The output circuit of transistor 21 includes a load resistor 23 coupled to a source of positive operating voltage (+v), a high frequency peaking coil 24, complementary emitter follower output buffer transistors 25 and 26, and diodes 27 and 28 which bias transistors 25 and 26 for linear conduction. A high level amplified red color signal R is derived from the interconnected emitter circuits of transistors 25 and 26, and is conveyed to the red kinescope cathode via an AC coupling capacitor 30a and a high frequency peaking network including a peaking coil 32 and a damping resistor 34.

A keyed brightness control clamping network 33a included in the red video signal channel coacts with AC coupling capacitor 30a as will be discussed. Similar clamping networks 33b and 33c included in the green and blue video signal channels coact with associated AC coupling capacitors 30b and 30c, respectively. A network 40 provides brightness determinative keying pulses to clamp networks 33a, 33b and 33c.

Network 40 includes a common emitter inverting amplifier transistor 42 with a base input electrode for receiving positive keying pulses via an input circuit including a current determining resistor 43, a speed-up circuit including the series combination of a resistor 41 and a speed-up capacitor 44 shunting resistor 43, and a manually adjustable brightness control potentiometer 45. Resistor 41 serves as a current limiter with respect to positive-going edge transitions of the input keying pulse as conducted by resistor 41 and capacitor 44. A resistor 46 assists to establish a desired brightness control range, and a resistor 47 establishes the base bias of transistor 42 together with a feedback resistor 48. The signal gain of the amplifier stage including transistor 42 is determined by means of feedback resistor 48 and input resistor 43. A waveform shaping capacitor 50 is coupled between the base input circuit and the collector output circuit of transistor 42.

Transistor 42 is normally nonconductive and is biased for nonsaturated operation when keyed to conduct by the input keying pulse, which occurs during the relatively short "back porch" interval of each horizontal line blanking interval. The input keying pulse exhibits a duration of one to two microseconds and a peak-to-peak amplitude of approximately six volts, for example. The magnitude of a negative-going clamp keying voltage pulse produced at the inverting collector output of transistor 42 is determined by the base current of transistor 42, the magnitude of which and the conduction level of transistor 42 being related to the setting of brightness control potentiometer 45.

The output clamp keying pulse thus exhibits a varible amplitude of, e.g., twenty to forty volts peak-to-peak amplitude as brightness control 45 is adjusted between MIN and MAX extreme settings, and is coupled via a pre-set brightness tracking potentiometer 36a for the red signal channel, a buffer transistor 37 and a coupling capacitor 38 to a cathode switching control electrode of a normally non-conductive clamp diode 35 included in clamping network 33a. The negative-going clamp keying pulse renders clamp diode 35 conductive whereby the charge on coupling capacitor 30a, and thereby the brightness of a displayed image, are modified in accordance with the peak amplitude of the clamp keying pulse. Thus, for example, increased image brightness results when the clamp keying pulse exhibits an increased peak-to-peak amplitude, which causes a more negative voltage to be produced at the cathode of diode 35. The plate of capacitor 30a which is coupled to the anode of diode 35 is thereby clamped to a more negative voltage, which results in a less positive DC bias potential at the red kinescope cathode and a related increase in image brightness.

A pre-set potentiometer 31 establishes a desired bias for clamp diode 35, and a resistor 39 coupled between the kinescope cathode signal path and a high operating potential (B+) provides a DC path for clamp diode 35.

Pre-set adjustable brightness tracking potentiometer 36a, which via the wiper thereof couples an amplitude adjusted version of the brightness determinative clamp keying pulse from the output of amplifier transistor 42 to clamp diode 35, is adjusted during system alignment to ensure proper kinescope drive ratios and white image balance for all brightness adjustment levels. Brightness tracking potentiometers 36b and 36c serve a similar function with respect to the green and blue signal channels. For a given change in the setting of brightness control 45 the amplitudes of the clamp keying pulses from the wipers of potentiometers 36a, 36b and 36c vary more or less depending on the settings of these controls. The amplitude of the clamp keying pulse at the collector of transistor 42 is approximately a linear function of the brightness control setting due to the degenerative feedback provided by resistor 48. The positioning of controls 36a, 36b and 36c between the output of keyed amplifier circuit 40 and clamp circuits 33a, 33b and 33c advantageously requires the use of only one keyed amplifier circuit to produce keying pulses of a level compatible with the requirements of the clamp circuits.

In applications requiring a clamp keying pulse with a fast amplitude rise time, the rise time of the transistor 42 collector current can be substantially reduced by means of speed-up capacitor 44. Capacitor 44 compensates for an otherwise unacceptably slow collector current rise time due to unavoidable small base currents which charge emitter and collector junction capacitances of transistor 42. However, it has been observed that in the absence of capacitor 50 with a given value of speed-up capacitor 44, the shape of the clamp keying voltage pulse at the collector of transistor 42 changes undesirably as the base current of transistor 42 is varied by means of brightness control 45. This unwanted effect is eliminated by choosing the value of speed-up capacitor 44, in the absence of capacitor 50, large enough so that the leading edge of a positive-going current pulse at the base of transistor 42 would be peaked for all settings of brightness control 45, and by choosing the value of shaping capacitor 50 to be less than the value of capacitor 44. This aspect of network 40 is discussed in greater detail in a copending U.S. patent application Ser. No. 675,780 filed on Nov. 28, 1984, titled "Pulse Amplifier in a Brightness Control System".

What is claimed is:

1. In a video signal processing and display system including a color image display device having plural intensity control electrodes, and plural video output driver amplifier stages for respectively providing video output signals to said intensity control electrodes, apparatus comprising:

plural means for respectively AC coupling video output signals from said driver stages to said intensity control electrodes of said image display device;

plural switching means, each having a control input, respectively coupled to said AC coupling means for forming plural video signal clamps therewith;

amplifier means with an input and an output;

adjustable brightness control means coupled to said amplified means;

source of keying pulses, occurring during video signal clamping intervals, coupled to said amplifier means for enabling said amplifier means to produce brightness determinative output pulses with amplitudes in accordance with a setting of said brightness control means; and plural adjustable means coupled in common to said output of said amplifier means and coupled separately to said control inputs of said switching means for conveying to said control inputs amplitude adjusted versions of said brightness determinative output pulses.

2. Apparatus according to claim 1, wherein said image display device is a kinescope;

said intensity control electrodes are cathode electrodes; and said plural adjustable means comprise plural potentiometers with respective wipers coupled to said control inputs of said switching means.

3. Apparatus according to claim 1, wherein said brightness control means and said source of keying pulses are coupled to said input of said amplifier means; and a degenerative feedback circuit is coupled from said output to said input of said amplifier means.

4. Apparatus according to claim 3, wherein said amplifier means comprises a transistor with a base input electrode coupled to said brightness control means and to said source of keying pulses, a collector output electrode coupled to said plural video signal clamps via said plural adjustable means, and a common emitter electrode coupled to a reference potential; and a degenerative feedback resistance is coupled from said collector electrode to said base electrode.

* * * * *